United States Patent [19]

von Borries et al.

[11] 4,375,824

[45] Mar. 8, 1983

[54] VALVE ASSEMBLY WITH SILENCER

[75] Inventors: Horst von Borries, Krefeld; Hans-Gerd Rittel, Wendlingen, both of Fed. Rep. of Germany

[73] Assignee: Feldmühle Aktiengesellschaft, Düsseldorf, Fed. Rep. of Germany

[21] Appl. No.: 156,329

[22] Filed: Jun. 4, 1980

[30] Foreign Application Priority Data

Jun. 7, 1979 [DE] Fed. Rep. of Germany ....... 2923074

[51] Int. Cl.³ ....................... F16K 11/06; F16K 47/04
[52] U.S. Cl. ............................ 137/614.17; 137/625.4; 251/120
[58] Field of Search ................. 137/625.41, 625.17, 137/625.4, 614.17; 251/120, 118

[56] References Cited

U.S. PATENT DOCUMENTS

| | | | |
|---|---|---|---|
| 2,853,264 | 9/1958 | Lodge | 251/120 |
| 2,858,851 | 11/1958 | Holl | 251/174 X |
| 3,834,416 | 9/1974 | Parkison | 137/454.2 X |
| 3,951,169 | 4/1976 | Loose | 137/454.2 |

FOREIGN PATENT DOCUMENTS

| | | |
|---|---|---|
| 2230174 | 1/1974 | Fed. Rep. of Germany . |
| 2356211 | 5/1975 | Fed. Rep. of Germany . |
| 2356326 | 5/1975 | Fed. Rep. of Germany . |
| 1967118 | 8/1977 | Fed. Rep. of Germany . |
| 2622179 | 12/1977 | Fed. Rep. of Germany . |
| 2626386 | 12/1977 | Fed. Rep. of Germany . |
| 2658024 | 6/1978 | Fed. Rep. of Germany . |

*Primary Examiner*—Arnold Rosenthal
*Attorney, Agent, or Firm*—Toren, McGeady and Stanger

[57] ABSTRACT

A valve assembly for controlling fluid flow, either of a single fluid or for mixing two different fluids such as hot and cold water, operates with a pair of interengaging valve plates having inlet orifices and outlet orifices defined therethrough actuated relative to each other to align the orifices to effect fluid flow. A chamber is defined on one side of one of the plates and a silencer disk is arranged within the chamber with spring means being provided to urge the silencer disk against one of the plates to effect closure of at least the inlet opening of the valve assembly. In operation, inlet fluid pressure operates against the force of the spring means to lift the silencer disk from the one valve plate to enable flow through the valve assembly.

15 Claims, 9 Drawing Figures

VALVE ASSEMBLY WITH SILENCER

The present invention relates generally to liquid valve assemblies and more particularly to a valve assembly including a silencer or noise suppression device. More specifically, the invention is directed toward a valve of the type wherein control of one or more liquids is effected by means of interengaging valve plates which define therethrough at least one inlet opening and one outlet opening with a deflection or mixing chamber being arranged in operative relationship with the interengaging plates.

Valves equipped with valve plates for controlling liquid flow have been known for some time. Such valves may operate to discharge a specific amount of liquid, to facilitate mixture of two or more liquids or for controlling the mixing ratio between two liquids. The valve plates which are operated to control such valve assemblies are generally formed as planar parallel disks which are subjected to a precision finishing operation in order to ensure that an accurate planar configuration is developed so that a tight sealing action will be provided.

The control valve plates originally were formed to consist of resistant metals. However, in recent times they are usually made of a high grade or high quality sintered oxide ceramic material. Generally, one of the disks is arranged to be stationary; that is, it is anchored in a housing so as to be secured against rotation. The other disk slides upon the first disk and the sliding action may be controlled in such a way that both inlet and outlet openings formed to extend through the disks may be brought into alignment by mutual rotation of the disks so that liquid inlet openings and liquid outlet openings may be arranged to enable fluid flow through the valve assembly. For example, openings in the movable disk which may be considered the control disk, may be brought into alignment with openings in the stationary disk so that liquid inlet apertures and liquid outlet apertures, for a liquid such as water, may be aligned to regulate flow.

In valves operating as regulating valves wherein it is not necessary to mix several different liquids, but wherein the liquid volume is to be controlled, a deflection chamber is generally assigned to the valve control disk. The deflection chamber may be arranged directly adjacent the valve control disk and will serve for changing the direction of water flow which, in the normal case, will rise from below the control disk through the stationary valve seat disk in order to be deflected, generally through angles of 90° or 180°.

The same deflection function is also required in mixing valves. However, in these valve it is additionally required that in addition to regulation of the amount of water or liquid, regulation of the temperature of the water may also be effected. That is, the stationary or valve seat disk will be formed with a pair of inlet openings one each for hot and cold water respectively, with these openings being capable of being opened or closed to different degrees. Accordingly, if a mixture of the hot and cold water is to be provided whereby regulation of the temperature of the water at the outlet may be effected, water flow from both inlet openings into the deflection chamber will occur and under such circumstances the deflection chamber may be referred to as a mixing chamber inasmuch as the mixing of the different liquids will occur in this chamber.

As in all valves, vibrations tend to occur as well in valves which are equipped with valve plates because flow conditions change with the rate of flow. Such vibrations will result in noise and the generation of such noise may be quite substantial. Noise generation is particularly undesirable in sanitary fittings because they are used in living quarters. Thus, it must be possible to enable utilization of a tap system for a shower or bathtub even during nighttime hours without causing disturbance to nearby residents due to noise levels.

In order to reduce noise levels, it has been proposed in prior art U.S. Pat. No. 3,433,264 to arrange a stepped rim in the control plate of the valve. In this device, the valve consists essentially of two valve plates wherein the valve plate operating as the control plate has the deflection chamber wherein the stepped rim is arranged. This arrangement is intended to effect swirling or turbulence of the liquid flow emerging from the valve seat plate opening and thus to silence generated noise. However, it has been shown in practice that the silencing effect is not sufficient to reduce annoying noise to a significant degree. A device disclosed in German Offenlegungsschrift No. 26 58 024 develops a similar concept wherein the bottom surface of the mixing chamber is profiled so that swirling or turbulent action will also occur. However, once again, the noise reduction achieved in this prior art device has been found to be insufficient.

In German Offenlegungsschrift No. 22 30 174 there is disclosed a device which requires that the sum of the cross sectional area of the inlet be at least equal to the cross sectional area of the outlet in order to achieve silencing by means of a resulting damming effect on the water. This proposal also offers only an incomplete solution to the noise problem because critical noise ranges occur when the valve is only slightly opened. However, a resulting damming effect on the water is incomplete and therefore it does not achieve the desired improvement.

A further prior art device disclosed in British Pat. No. 1,437,280 involves utilization of an insert in the mixing chamber of the control plate which comprises a type of diaphragm allowing an increase in the volume of the mixing chamber. In this case, the diaphragm is arranged a specific distance from the bottom of the mixing chamber and the diaphragm expands in the direction toward the bottom of the mixing chamber and is also arranged at a specific distance from the water inlet opening of the valve seat plate. Again, in this device, the silencing effect is incomplete particularly in the critical ranges where small amounts of liquid or water flow occur.

Accordingly, it has been found that none of the aforementioned prior art proposals have been sufficiently effective. In practice, desired results have been obtained only by utilization of an arrangement of screens such as is disclosed, for example, in U.S. Pat. Nos. 3,834,416 and 3,893,482, and in German Offenlegungsschrift Nos. 26 22 179 and 26 26 386. In the devices disclosed in these prior art references, water flows through the screens thereby effecting a noise damping and thus a desired noise reduction. However, the use of screens involves a significant disadvantage inasmuch as it has been found practically impossible to maintain the line system of the water supply completely free of foreign matter. Thus, within a relevantly short time, impurities located in the line system, which essentially comprise lime deposits and rust, are washed into the initially fully effective stacks of screens so that the stacks of screens become clogged. This not only results in loss of the desired silencing effect but in many cases a reduction in the rate of flow occurs in the valve until it becomes finally clogged.

Accordingly, the present invention is directed toward the task of avoiding the disadvantages of prior art silencing techniques and to provide a valve which will not clog but which nevertheless offers a stationary silencing effect over a long service life of the valve. Furthermore, the invention is directed toward provision of a structure for installations of this type which will achieve the desired purpose as inexpensively as possible by further reduction in costs such as may be involved in devices utilizing stacks of screens and to simplify the assembly of such devices.

SUMMARY OF THE INVENTION

Briefly, the present invention may be defined as a valve assembly with a silencer mechanism wherein control of one or more flowing liquids is effected by means of interengaging valve plates having at least one inlet opening and one outlet opening wherein a deflection or mixing chamber is arranged in cooperative relationship therewith, with the characterizing feature of the invention involving a movable silencing disk arranged in the deflection or mixing chamber operating to close at least the inlet opening means of the valve assembly by means of an applied pressure.

In accordance with the invention, the silencing disk forms a resilient seal at the inlet opening means which may be lifted by the pressure of the liquid inlet flow, which in the case of sanitary fittings will be water. A connection with the outlet opening will occur only after this lifting action has been effected wherein due to the resilient pressure the lifting action will correspond to the opened cross sectional area of the inlet opening. Accordingly, the space available for flow of water is automatically determined by the degree of which the valve is opened, with the water flow being always dammed also in the case of a minimal opening so that noise due to the flow will be reduced or eliminated.

The automatically adjustable connection provided in the present invention between the inlet opening and the outlet opening may be effected by means of a simple disk which is pressed against the inlet means in a resilient member. Accordingly, this component is especially simple and, unlike the expedient utilizing stacks of screens, water is not required to flow through this component. This will ensure that clogging will not occur as is usually the case when stacks of screens are utilized. Impurities present in the water, such as sand, rust, lime and the like, cannot settle and will be washed away with the liquid or water flow.

It has been found sufficient to construct the silencing disk of a size such that it will only cover the inlet opening means which in the case of a mixing valve may be a plurality of inlet openings. However, in a preferred embodiment of the invention the silencing disk may be formed to close the inlet opening and the outlet opening.

This embodiment is particularly advantageous when the fittings have only small dimensions and where the silencing disk is arranged in a mixing or deflection chamber which is formed by a valve plate. Moreover, the arrangement results in a larger damming area.

In a preferred embodiment of the invention, the side of the silencer disk which is located opposite the opening in the valve plate is provided with a rough surface. Despite the rough surface, a clean sealing of the openings of the valve plate may be provided. However, the rough surface of the silencer disk results in a turbulent flow at the silencer disk even in the case of minimal flow rates so that noises will be prevented with a high degre of effectiveness even in the case of smaller flow rates.

In a very advantageous embodiment of the invention, the silencer disk is provided with projections which engage in the inlet opening means of the valve assembly. By engagement of the projections in the inlet opening means it is possible to fix the position of the silencer disk and no special measures will be necessary to support the silencer disk in the desired position. The length of the projection will ensure that the silencer disk will always be guided in the inlet opening means even during possible lifting of the disk.

A particularly advantageous embodiment of the invention provides that the projections of the silencer disk are formed with a configuration which narrows in the direction toward the valve plate. The narrowing of the projection, which may have the shape of a truncated cone, will cause an increase in the amount of water flow with increasing lift of the disk so that a correspondingly steady increase in the opening of the valve will be effected upon actuation of the valve lever. Accordingly, the projections will not obstruct the flow of water and since, however, they will have already begun to deflect water before it passes through the control disk, there will result a further damping of vibration noise.

The silencer disk is advantageously pressed against the valve plate by means of elastic material. Practically all compressible materials may be used as the elastic material. Accordingly, it is possible to place a piece of expanded rubber behind the silencing disk or to insert resilient cushions of foam material or air-inflated cushions through which the required spring force may be applied on the silencing disk.

Advantageously, the silencing disk may be pressed against the valve plate also by means of a spring. However, in this case, the spring may consist of stainless steel and it may be constructed in the shape of a cup spring or in the shape of a normal compression or leaf spring. As compared with use of porous, pressure-applying elastic materials, the use of springs offers the advantage that clogging as might occur in porous foam rubber or the like, will not occur. Thus, the service life will be extended in a device wherein springs are utilized.

In a particularly advantageous embodiment of the invention, the silencer disk is provided with resilient legs. As a result, a single component may be created which is inserted into the mixing or deflection chamber. This will significantly simplify the assembly and by proper selection of the type and thickness of the legs, it will be simultaneously possible to adjust contact pressure of the silencer disk.

The silencer disk may advantageously be formed of plastic materials so that a relatively inexpensive injection molded piece made, for example, of polyamide may be utilized. When the silencer disk is made of plastic material, it is possible to injection mold the legs integrally with the disk in order to ensure that the shape of the legs will be such as to provide the required contact pressure.

One preferred embodiment of the invention provides that the silencer disk be made of natural or synthetic rubber. In this case, the use of such materials will reduce the cost of the disk and it may be inexpensively manufactured as a mass-produced article. However, compared with other materials, rubber has a significantly higher silencing capacity and in addition it has the significant advantage that, as in the case of plastic material, it is corrosion resistant. Moreover, by selection and possible combination of various types of rubber, the hardness of the silencer disk as well as the spring force which may be developed can be freely selected by means of design of the resilient legs.

The selection of rubber as the material for the silencer disk makes it possible to vulcanize a leaf spring, cup spring or helical spring directly together with the silencer disk and to obtain a single component in this manner. However, the most advantageous approach is a spring which is integrally molded with the silencer disk wherein the spring, formed possibly as a leaf spring, may consist of the same rubber material as the silencer disk.

Pipe lines with which sanitary fittings, such as valves or the like, are connected will have different water pressures in accordance with the location of the respective connection points. Accordingly, in the case of high water pressure, the water pressure would fully act on the silencer disk even when the valve is only slightly opened without giving rise to the possibility of control of the intended resilient pressure of the silencer disk against the inlet openings or to always maintain a constant pressure difference between the water pressure and the counterpressure from the silencer disk. In order to avoid the necessity for providing a plurality of possibilities for the resilient contact or spring pressure application whereby the valve may be adjusted to the respective pressure requirements, a particularly preferred embodiment of the invention provides that the silencer disk be formed with at least one compensating bore in the region of the inlet means of the valve plate. This compensating bore may be formed to extend through the silencer disk into the space for volume of the mixing or deflection chamber located behind the disk. Thus, when the valve is opened, a pressure equilibrium will be obtained between this space and the space forwardly of the silencer disk, that is the point at the inlet opening. As a result, the pressure difference initially prevailing will be adjusted so that it will be possible to operate with the same pressure force in all valves and thus the valves may be designed for a wide range of pressure.

Instead of providing a compensating bore in the silencer disk, a further embodiment of the invention is advantageously formed with guide ducts in the silencer disk in the region of the inlet opening means of the valve plate. In this case, the guide duct means extend from the side of the silencer disk facing toward the inlet opening of the valve plate along the periphery of the silencer disk toward the opposite side so that pressure compensation may occur. The arrangement of the guide ducts instead of the compensating bore will be advantageous when an especially highly impure water must be anticipated thereby giving rise to a greater danger of clogging of the compensating bore.

A further advantageous embodiment of the invention provides that the silencer disk be formed with compensating bores and/or guide ducts in the region of the outlet opening as well, wherein the sum of the cross sectional areas of these outlet possibilities is greater than the sum of the cross sectional areas of the compensating bores or guide ducts in the region of the inlet opening. The arrangement of these compensating possibilities is useful when the silencer disk provides a relatively good seal for the deflection or mixing chamber toward the bottom so that compensation of pressure cannot occur in any other manner. As a result, there will be avoided a situation where the same pressure which exists at the front of the silencer disk when the valve is open will also exist behind the silencer disk. As a result, impairment of the function of the silencer disk or the valve will be avoided.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive manner in which there are illustrated and described preferred embodiments of the invention.

DETAILED DESCRIPTION OF THE PREFERRED EMBODIMENTS

Figure 1:
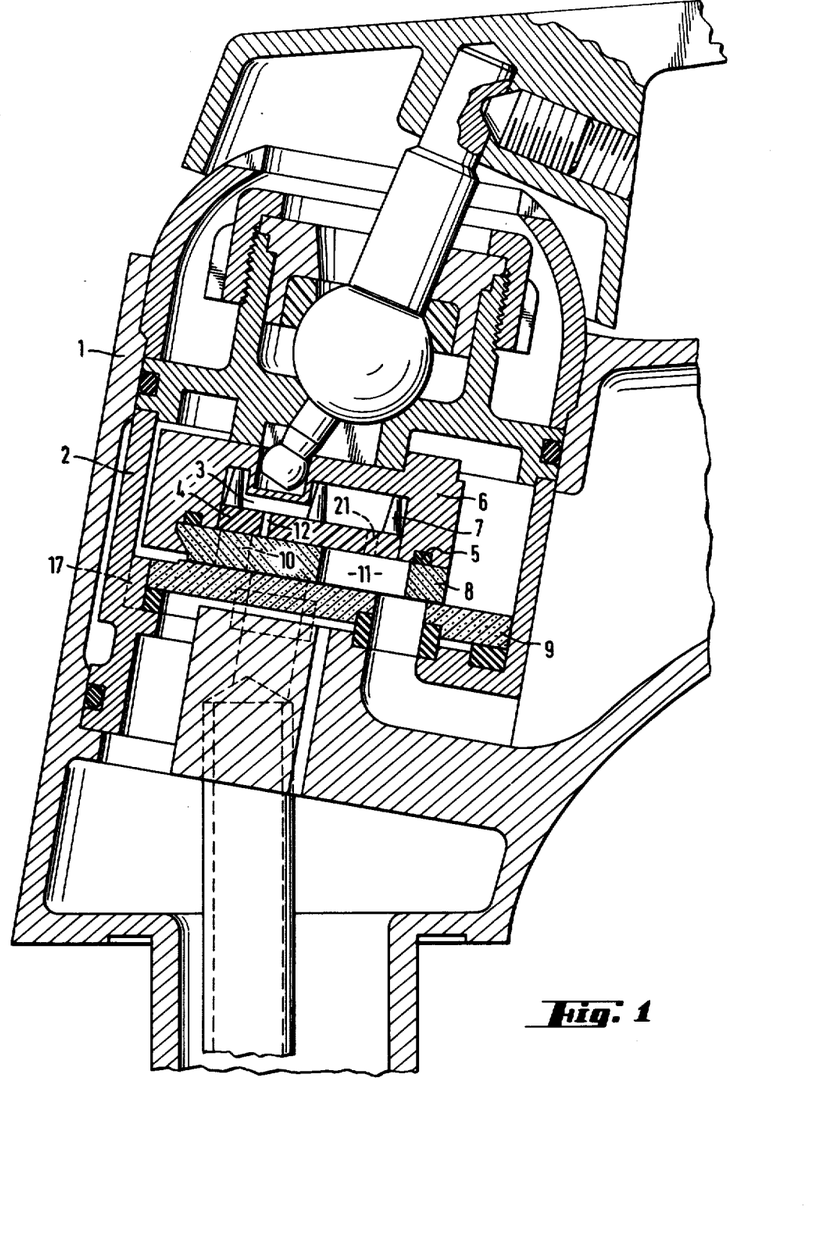
FIG. 1 is a sectional side view of a mixing valve assembly in accordance with the present invention.

Referring now to the drawings, wherein similar reference numerals are used to refer to like parts throughout the various figures thereof, there is depicted in FIG. 1 a valve assembly embodying the present invention. The valve assembly includes a valve housing 1 of a mixing valve for a washstand fitting comprising a cartridge 2. A valve seat disk 9 and a valve control disk 8 are arranged in the cartridge 2 in a manner whereby they may be easily replaced as a complete unit. Hot and cold water to be mixed passes through openings in the valve seat disk 9 and flows to the valve control disk 8 at an inlet opening 10 which is adapted to receive cold water and at an inlet opening 10' which is adapted to receive hot water.

Figure 8:
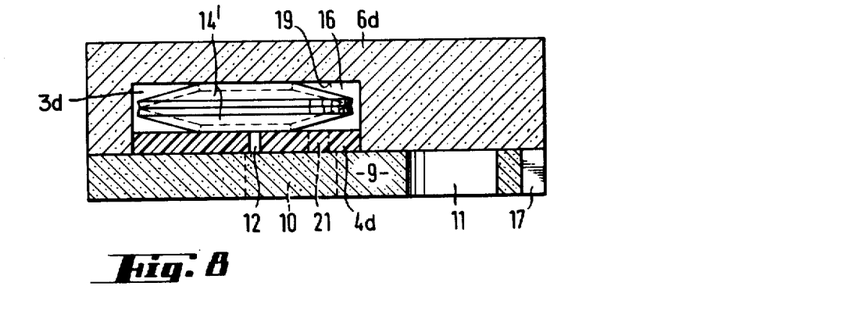
FIGS. 8 and 9 are sectional side views of two further embodiments of the invention.

A silencer disk 4 acting as a flow impeding member overlying the valve control disk 8 is arranged in a mixing chamber 3 defined by a control head 6. The embodiment of FIG. 1 represents a mixing valve including a mixing chamber 3 and the embodiments depicted in FIGS. 8 and 9 represent regulating valves wherein the control head 6d defines a deflection chamber 16.

The control head 6 bears in tight sealing engagement against the valve control disk 8 through a sealing ring 5. The silencing disk 4, arranged in the mixing chamber 3, is pressed against the valve control disk 8 by means of legs 7. Silencing disk 4 may be lifted from the valve disk 8 by water pressure at the inlet means of the valve when the water inlet opening 10 is opened. In the region of the water inlet opening 10 of the control disk 8, the silencer disk 4 is formed with a compensating bore 12 providing for pressure reduction. As soon as the valve control disk 8 has been brought into position wherein water reaches the inlet opening 10 in the valve control disk 8 through the valve seat disk 9, water will flow through the cross sectional area of the compensating bore 12 into the upper region of the mixing chamber 3 which is connected with the outlet opening 11 and through a compensating bore 21 so that pressure relief will occur.

A substantial amount of water flowing through the inlet opening 10 passes beneath the silencer disk 4 toward the bores 12,21 and will thereby reach the outlet opening 11. The legs 7 which are integrally molded with the silencer disk 4 consist of elastically deformable material and are compressed by the prevalent water pressure. This action will increase the distance between the silencer disk 4 and the valve control disk 8 so that water will flow from the inlet opening 10 to the outlet opening 11. The control head 6, which defines either the mixing chamber 3 or the deflection chamber 16, may consist in many cases of plastic material and it may, for example, be an injection molded member formed of polyamide.

Figure 9:
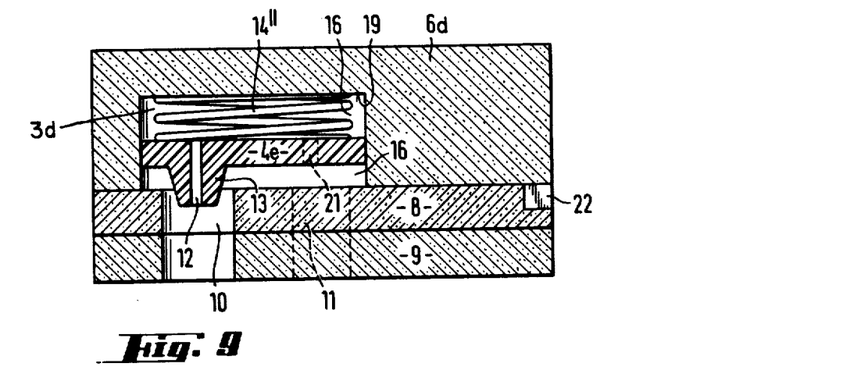

However, as shown in FIG. 9, the control head 6d may also be constructed as a member of ceramic materials and it may be connected with the control disk 8 through cams 22. In accordance with FIG. 9, the silencer disk 4e is pressed by means of a helical spring 14" which consists of stainless steel. The compensating bore 12 of the silencer disk 4e is guided by means of a projection 13 which extends into the inlet opening 10 so that the silencer disk 4e will be nonrotatably held in the mixing chamber.

Figure 2:
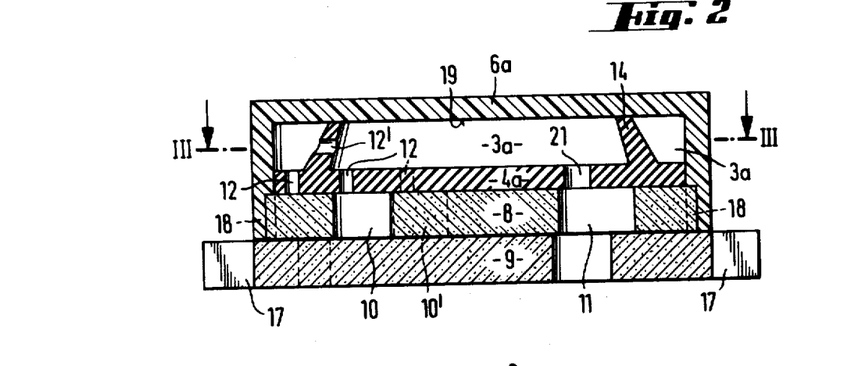
FIGS. 2, 4 and 6 are, respectively, cross sectional views of various embodiments of the present invention shown in greater detail.
Figure 3:
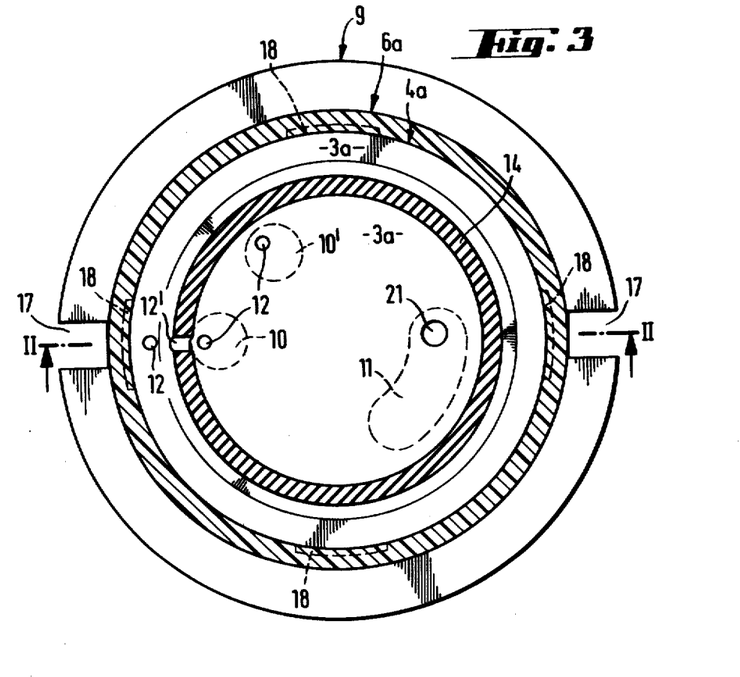
FIGS. 3, 5 and 7 are, respectively, sectional top views of the embodiments of FIGS. 2, 4 and 6.

Alternative types of spring means can be utilized to apply a desired spring force against the silencer disk 4d or 4e. As shown in FIG. 8, a cup spring can be utilized in place of the helical spring 14" and, in FIG. 8, the spring is shown as a double-cup spring 14' consisting of a rustproof metal. In the embodiment of FIGS. 2 and 3 there is provided a means 14 formed integrally with the silencer disk 4a and arranged to bear against the bottom 19 of the control head 6a defining the mixing chamber 3a. The spring means 14 is formed with an annular configuration and consists of the same synthetic rubber material as the silencer disk 4a. Since as a result of this configuration, the mixing chamber 3a is divided into two enclosed volumes in its upper region, the silencer disk 4a has three compensating bores 12 formed therein, with two of these bores being arranged in the inner region and with one of the bores being arranged in the outer region. The spring means 14 is additionally provided with a compensating bore 12' in order to effect pressure compensation between the inner and outer regions defined above the silencer disks 4a.

Figure 4:
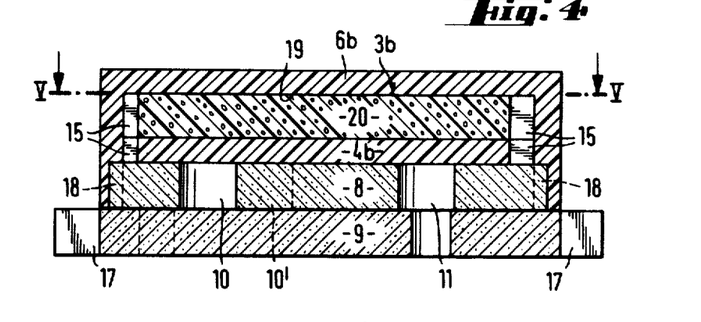
Figure 5:
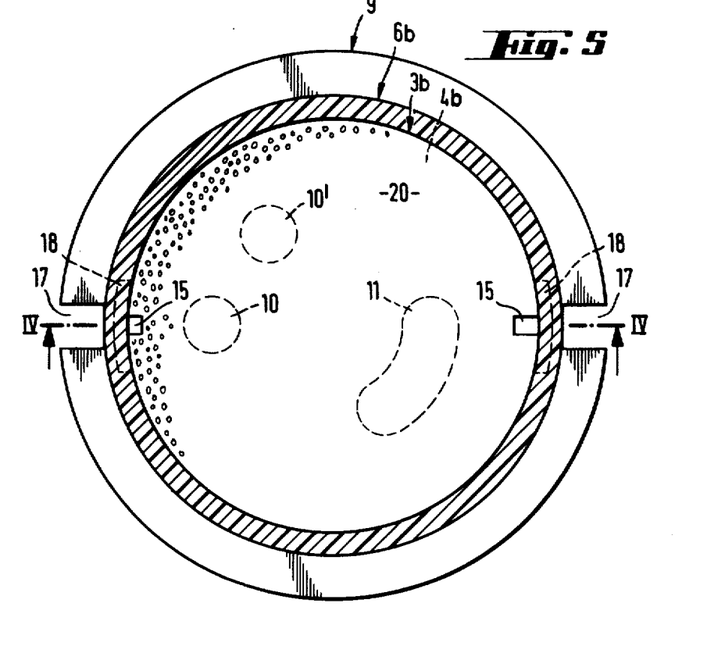
Figure 6:
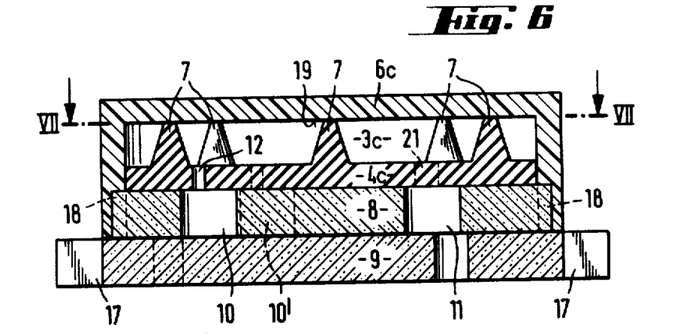
Figure 7:
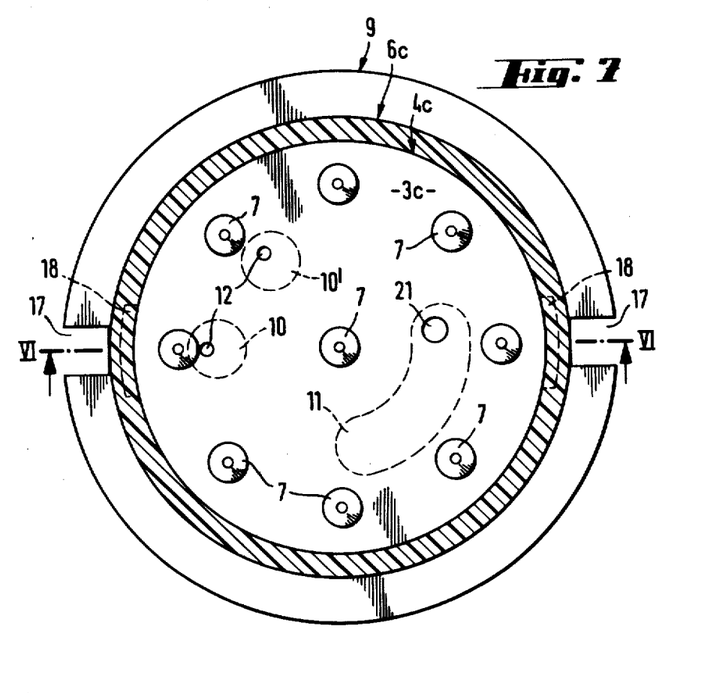

In FIGS. 4 and 5 the spring means are formed by a compressible material consisting of a closed-cell foam 20 which operates in place of the spring means 14. Instead of a compensating bore 12, the silencer disk 4b is arranged with two guide ducts 15 which are located at the periphery of the silencer disk 4b and which also extend through the foam spring 20. The guide ducts 15 serve for pressure release in the same manner as the compensating bores previously described.

The valve seat disk 9 is formed with recesses 17 in order to secure the disk against rotation. The recesses 17 are engaged with cams (not shown) which are formed in the cartridge 2. As a result, the valve seat disk 9 will be securely held in the cartridge 2. Furthermore, the side of the valve disc 4b located opposite the inlet and outlet openings is formed with a roughened surface.

While specific embodiments of the invention have been shown and described in detail to illustrate the application of the inventive principles, it will be understood that the invention may be embodied otherwise without departing from such principles.

What is claimed is:

1. A valve assembly with a silencer installation for controlling fluid flow therethrough comprising a pair of cooperating valve plates maintained in sliding contact with each other and movable relative to each other to control fluid flow through said valve assembly, inlet aperture means an outlet aperture means defined to extend through said valve plates, said valve plates being operable to effect alignment and nonalignment of said inlet and outlet aperture means in respective ones of said plates to control fluid flow through said valve assembly, silencer means for reducing noise in the operation of said valve assembly, said silencer means comprising a flow impeding member movable between a first position in abutting contact with one of said plates and a second position spaced away from said one plate, said flow impeding member being configured to overlie at least said inlet aperture means to substantially impede fluid flow at least through said inlet aperture means when in said first position and to substantially decrease the impedance to fluid flow through said inlet aperture means when in said second position, and spring means applying a resilient force urging said flow impeding member against said one plate into said first position to impede said flow, said spring means being constructed to allow said flow impeding member to be urged away from said one plate toward said second position by fluid pressure through said inlet aperture means overcoming the resilient force of said spring means.

2. A valve assembly according to claim 1 wherein said flow impeding member is arranged to overlie and impede flow through both said inlet aperture means and said outlet aperture means in response to said resilient force applied thereto when in said first position.

3. A valve assembly according to claim 1 or 2 wherein said flow impeding member comprises a disk having a side located opposite said inlet and outlet aperture means, said side having a rough surface.

4. A valve assembly according to claim 3 wherein said disk is provided with projection means engaging into said inlet aperture means.

5. A valve assembly according to claim 4 wherein said projection means comprises a projection extending from said disk and narrowing in a direction toward said valve plates.

6. A valve assembly according to claim 1 wherein said spring means consists of stainless steel.

7. A valve assembly according to claim 1 or 2 wherein said flow impeding member comprises a disk consisting of plastic material.

8. A valve assembly according to claim 1 or 2 wherein said flow impeding member comprises a disk consisting of rubber.

9. A valve assembly according to claim 1 or 2 wherein said flow impeding member is formed with guide ducts at least in the region of said inlet aperture means.

10. A valve assembly according to claim 9 wherein said flow impeding member is formed with guide ducts in the region of both said inlet and said outlet aperture means.

11. A valve assembly according to claim 1 or 2 wherein said flow impeding member is provided with at least one pressure compensating bore in the region of said inlet aperture means.

12. A valve assembly according to claim 1 or 2 wherein said flow impeding member is provided with pressure compensating means in the regions of both said inlet aperture means and said outlet aperture means, with a total cross-sectional area of said pressure compensating means in the region of said outlet aperture means being greater than the cross-sectional area of said pressure compensating means in the region of said inlet aperture means.

13. A valve assembly according to claim 12 wherein said pressure compensating means comprise compensating bores.

14. A valve assembly according to claim 12 wherein said pressure compensating means comprise guide ducts.

15. A valve assembly according to claim 1 or 2 wherein said spring means comprise resilient legs integrally formed on said flow impeding member.

* * * * *